(12) United States Patent
Shin et al.

(10) Patent No.: US 9,749,610 B2
(45) Date of Patent: Aug. 29, 2017

(54) SPATIAL IMAGE PROJECTION APPARATUS

(71) Applicants: LG ELECTRONICS INC., Seoul (KR); KWANGWOON UNIVERSITY INDUSTRY-ACADEMIC COLLABORATION FOUNDATION, Seoul (KR)

(72) Inventors: Sungchul Shin, Seoul (KR); Eunsoo Kim, Seoul (KR); Seungcheol Kim, Seoul (KR)

(73) Assignees: LG ELECTRONICS INC., Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 24 days.

(21) Appl. No.: 14/875,922

(22) Filed: Oct. 6, 2015

(65) Prior Publication Data

US 2016/0100138 A1   Apr. 7, 2016

(30) Foreign Application Priority Data

Oct. 6, 2014   (KR) .................. 10-2014-0134178

(51) Int. Cl.
*G03B 21/28*   (2006.01)
*G03B 21/60*   (2014.01)
(Continued)

(52) U.S. Cl.
CPC ......... *H04N 13/0055* (2013.01); *G02B 5/124* (2013.01); *G03B 21/10* (2013.01); *G03B 21/28* (2013.01); *G03B 21/60* (2013.01); *G03B 21/625* (2013.01); *H04N 13/0459* (2013.01); *G03B 35/18* (2013.01)

(58) Field of Classification Search
CPC ........ G03B 21/28; G03B 21/60; G02B 5/122; G02B 5/124; G02B 27/225; H04N 9/31; H04N 13/0459; H04N 13/0497; H04N 13/0055
USPC .... 359/458, 459, 478, 479, 429, 430; 353/7, 353/10, 98
See application file for complete search history.

(56) References Cited

U.S. PATENT DOCUMENTS

| 4,526,439 A * | 7/1985 | Okoshi | .................. G03B 21/60 353/7 |
| 8,721,091 B2 * | 5/2014 | Wunderer | .............. G02B 5/045 348/744 |

(Continued)

*Primary Examiner* — William C Dowling
(74) *Attorney, Agent, or Firm* — Birch, Stewart, Kolasch & Birch, LLP (57) ABSTRACT

A spatial image projection apparatus including a receiver configured to receive an image signal; a display unit configured to display an image acquired by processing the image signal; a projection unit configured to project a spatial image to a prescribed space by reflecting light corresponding to the image displayed on the display unit. Further, the projection unit includes a plate having a first surface facing the display unit and a second surface opposite to the first surface; and a protrusion arranged on the first surface or the second surface of the plate. In addition, the protrusion includes first and second slopes tilted at about 45 degrees relative to the surface of the plate, and an angle between the first and second slopes is about 90 degrees.

20 Claims, 10 Drawing Sheets

(51) Int. Cl.
*G02B 5/124* (2006.01)
*H04N 13/00* (2006.01)
*H04N 13/04* (2006.01)
*G03B 21/10* (2006.01)
*G03B 21/625* (2014.01)
*G03B 35/18* (2006.01)

(56) References Cited

U.S. PATENT DOCUMENTS

2010/0195055 A1* 8/2010 Maekawa .......... G02B 27/2292
353/10
2014/0022511 A1* 1/2014 Kuo .................... G02B 5/0221
353/10

\* cited by examiner

SPATIAL IMAGE PROJECTION APPARATUS

This application claims the benefit of Korean Patent Application No. 10-2014-0134178, filed on Oct. 6, 2014, which is hereby incorporated by reference as if fully set forth herein.

BACKGROUND OF THE INVENTION

Field of the Invention

The present invention relates to a spatial image projection apparatus, and more particularly to a spatial image projection apparatus which projects a spatial image via a projection unit.

Discussion of the Related Art

In general, a spatial image expresses depth, unlike a two-dimensional (2D) planar image. Further, when both eyes of a person perceive a spatial image, the person can experience a three-dimensional (3D) feeling. In addition, a spatial image projection apparatus is configured to project a spatial image, thus making a person experience a 3D feeling as though the person were viewing an actual scene.

Although 3D display technologies using, for example, a polarization, shutter glass, parallax barrier, and lenticular methods have been applied for spatial image projection, these methods require that special glasses be worn in order to view a stereoscopic image, and suffer from a limited view angle when no glasses are used. In addition, another method for spatial image projection is a volumetric method using a rotating screen. Although the volumetric method enables a person to view a 3D image in all directions, the person cannot touch the image because the image is present on a screen.

Figure 1:
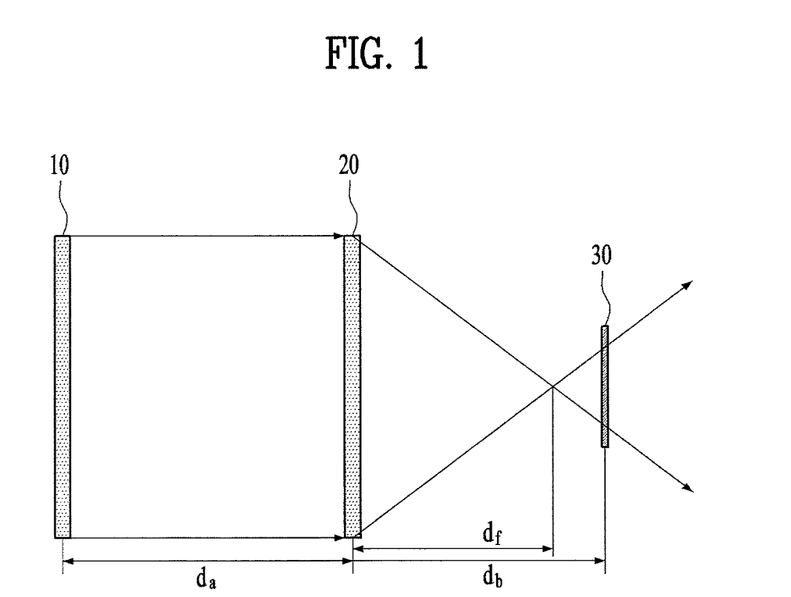
FIG. 1 is a view illustrating a general spatial image projection apparatus using a convex lens.

Another method is a spatial projection display method using a concave mirror or a convex lens. In particular, FIG. 1 is a view illustrating a related art spatial image projection apparatus using a convex lens. As illustrated in FIG. 1, the related art spatial image projection apparatus includes a display panel 10 which displays an image and a convex lens 20 which is spaced apart from the display panel 10 by a given distance and projects an image, which has been displayed on the display panel 10, onto a prescribed space.

Here, a spatial image 30 in the prescribed space is produced at a position forwardly spaced apart from the convex lens 20 by a given distance. In order to produce the spatial image 30 in the prescribed space as described above, a given space is required between the display panel 10 and the convex lens 20. That is, when the distance between the display panel 10 and the convex lens 20 is "da", the focal distance of the convex lens 20 is "df", and the distance between the convex lens 20 and the spatial image 30 is "db", the relationship of 1/db=1/df−1/da is established.

Accordingly, because of the necessity for the given space between the display panel 10 and the convex lens 20 in order to produce the spatial image 30 in front of the convex lens 20, the related art spatial image projection apparatus inevitably requires a very bulky configuration and is of limited usefulness in various fields. In addition, the size of the spatial image 30 is smaller than an image displayed on the display panel 10 because the image on the display panel 10 is projected in front of the convex lens 20.

SUMMARY OF THE INVENTION

Accordingly, one object of the present invention is to provide a spatial image projection apparatus that substantially obviate one or more problems due to limitations and disadvantages of the related art.

Another object of the present invention is to provide a spatial image projection apparatus, which maintains a spatial image that is the same size as an image displayed on a display unit despite a reduction in the thickness of the entire apparatus, through the use of a projection unit having a plurality of protrusions.

To achieve these objects and other advantages and in accordance with the purpose of the invention, as embodied and broadly described herein, in accordance with an aspect, the present invention provides a spatial image projection apparatus including a receiver configured to receive an image signal; a display unit configured to display an image acquired by processing the image signal; a projection unit configured to project a spatial image to a prescribed space by reflecting light corresponding to the image displayed on the display unit. Further, the projection unit includes a plate having a first surface facing the display unit and a second surface opposite to the first surface; and a protrusion arranged on the first surface or the second surface of the plate. In addition, the protrusion includes first and second slopes tilted at about 45 degrees relative to the surface of the plate, and an angle between the first and second slopes is about 90 degrees.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE INVENTION

Hereinafter, the present invention will be described in more detail with reference to the accompanying drawings. A suffix such as "module" and "unit" may be used to refer to elements or components that will be described below. Use of such a suffix herein is merely intended to facilitate description of the specification, and the suffix "module" and "unit" may be mingled with each other.

In addition, although embodiments of the present invention will be described in detail with reference to the accompanying drawings and descriptions of the accompanying drawings, the present invention is not limited or restricted by the embodiments of the present invention. Although the terms used in the following description are selected, as much as possible, from general terms that are widely used at present while taking into consideration the functions obtained in accordance with the present invention, these terms may be replaced by other terms based on intensions of those skilled in the art, customs, emergence of new technologies, or the like. Also, in a particular case, terms that are arbitrarily selected by the applicant of the present invention may be used. In this instance, the meanings of these terms may be described in corresponding description parts of the invention. Accordingly, it should be noted that the terms used herein should be construed based on practical meanings thereof and the whole content of this specification, rather than being simply construed based on names of the terms.

A spatial image projection apparatus described in this specification may be included in, for example, a mobile phone, a smart phone, a laptop computer, a digital broadcast terminal, a personal digital assistant (PDA), a portable multimedia player (PMP), and a navigation system. However, it will be easily appreciated by those skilled in the art that the configuration of the spatial image projection apparatus according to the embodiments described in this specification may be applied to fixed terminals such as, for example, a mobile terminal, a digital TV, and a desktop computer.

Figure 2:
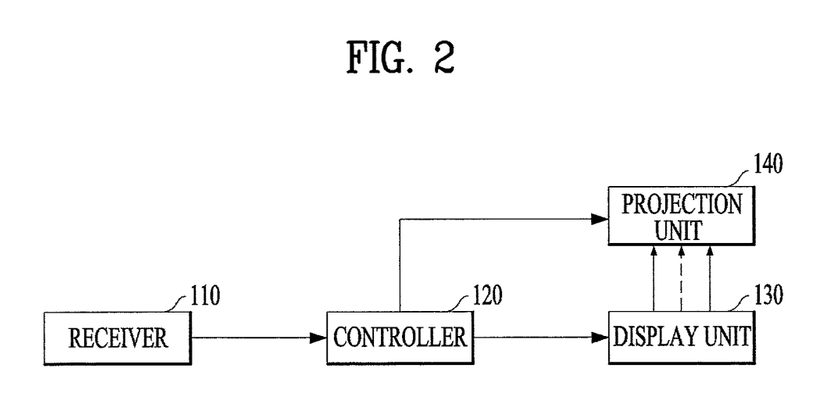
FIG. 2 is a block diagram illustrating a spatial image projection apparatus according to one embodiment of the present invention.

Turning first to FIG. 2, which is a block diagram illustrating a spatial image projection apparatus according to one embodiment of the present invention. As illustrated in FIG. 2, the spatial image projection apparatus includes a receiver 110, a controller 120, a display unit 130, and a projection unit 140.

In addition, the receiver 110 receives an image signal from an external device. The external device includes a storage medium in which images are stored, for example. The receiver 110 can additionally receive a projection position signal from the external device. In more detail, the projection position signal is a signal that determines the position of a spatial image which is produced by projecting an image to a prescribed space. For example, the projection position signal may be a signal that controls a motor used to move at least one of the display unit 130 and the projection unit 140, may be a signal that changes the state of the projection unit 140 that has a liquid crystal lens or a liquid lens, or may be a signal that controls a shutter included in the projection unit 140.

Further, the controller 120 processes the image signal and transmits the processed image signal to the display unit 130, thereby controlling the display unit 130 to display an image. In addition, the controller 120 controls the operation of a motor included in the display unit 130 and/or the projection unit 140 and the operation of the projection unit 140 in response to the projection position signal.

Further, the display unit 130 displays a spatial image to be projected to a prescribed space. In addition, the display unit 130 may be, for example, a general plane display unit, a volumetric 3D display unit using a rotating screen, a stacked 3D display unit, an integrated image based 3D display unit, or a hologram based 3D display unit. In one example, the display unit 130 may include at least one of a display panel, a screen, and a 3D object, which display an image. Then, the projection unit 140 can project a spatial image to a prescribed space by reflecting the light corresponding to the image displayed on the display unit 130.

The projection unit 140 may include a plate having a first surface facing the display unit 130 and a second surface opposite to the first surface, and at least one protrusion arranged on either the first surface or the second surface of the plate. In addition, the protrusion may include first and second slopes, which are tilted at 45 degrees relative to the surface of the plate, and the angle between the first and second slopes may be about 90 degrees. In one example, the projection unit 140 may be a prism array formed of a transparent material that transmits light, or may be a prism array formed of an opaque material that does not transmit light.

Figure 3:
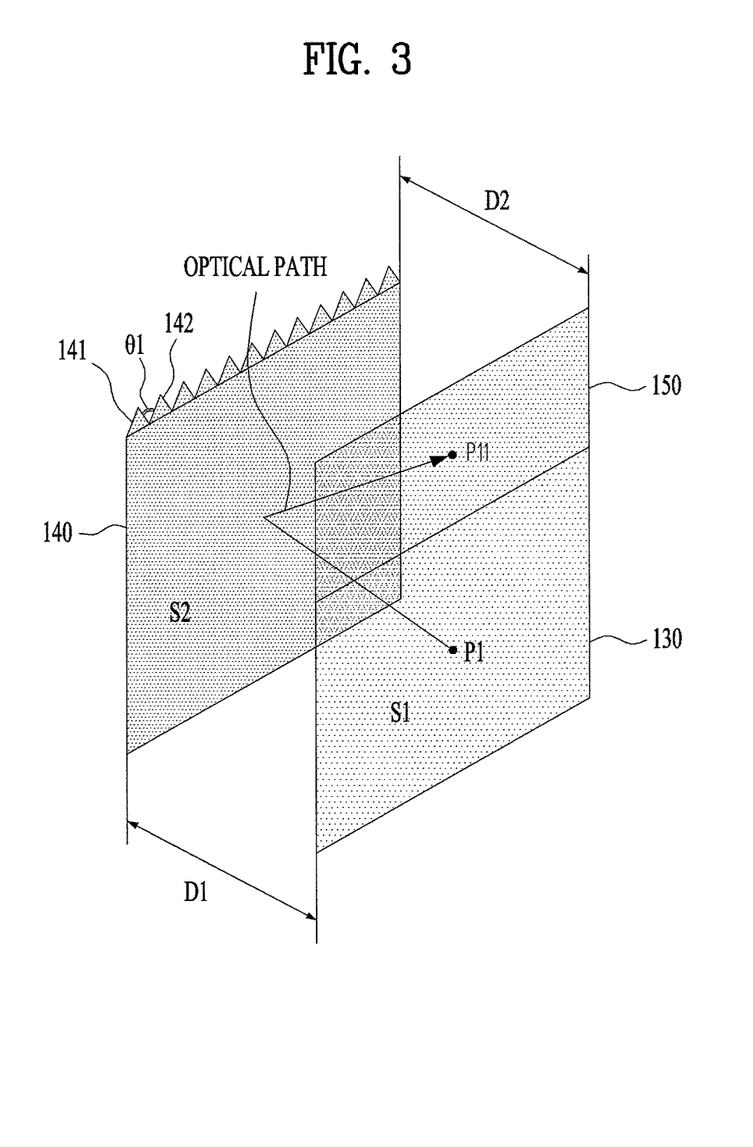
FIGS. 3 to 5 are views illustrating the positional relationship between a display unit and a projection unit illustrated in FIG. 2.
Figure 4:
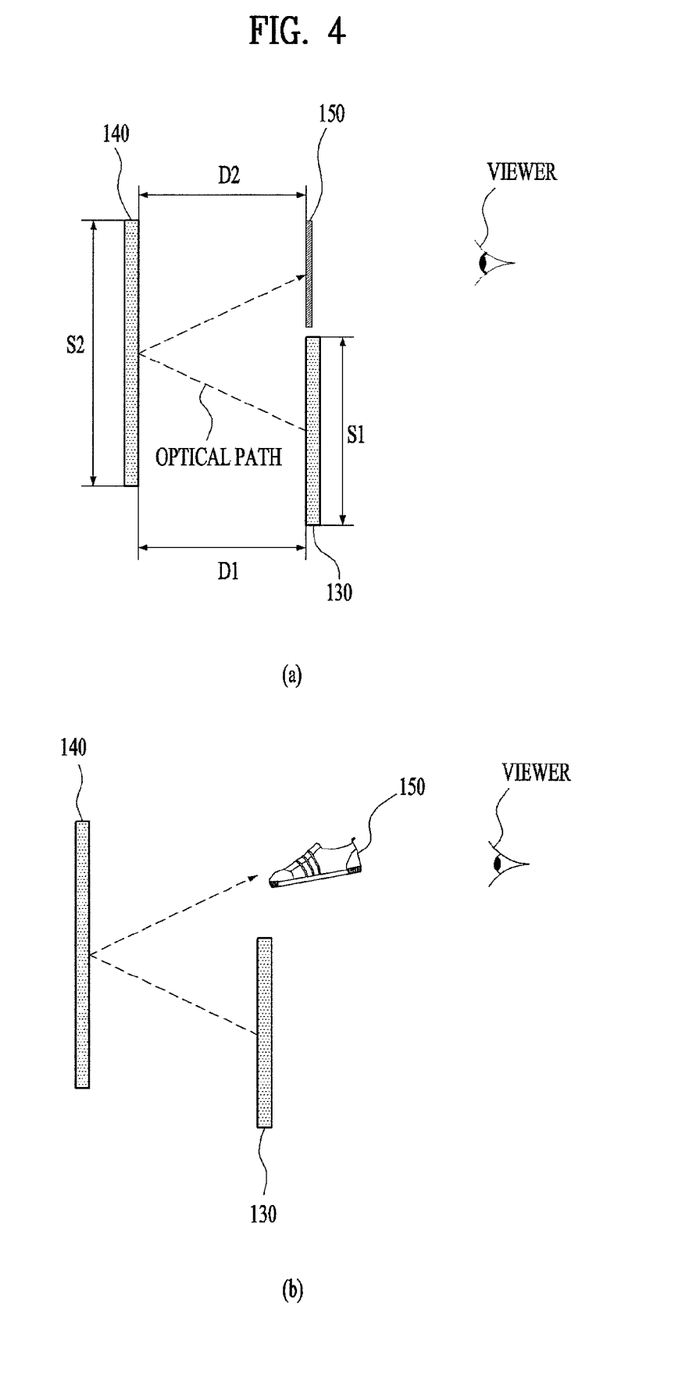
Figure 5:
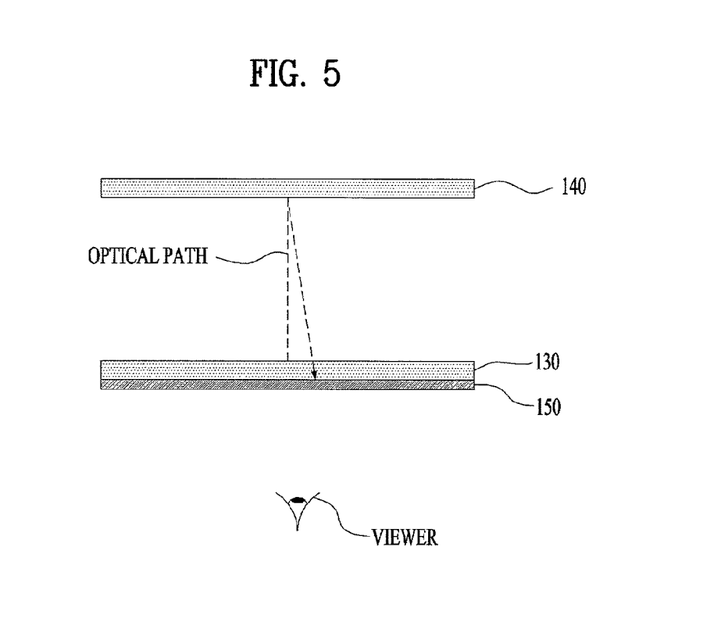

Next, FIGS. 3 to 5 are views illustrating the positional relationship between the display unit 130 and the projection unit 140 illustrated in FIG. 2, FIG. 3 being a perspective view, FIG. 4 being a side view, and FIG. 5 being a top view. As illustrated in FIGS. 3 to 5, the display unit 130 and the projection unit 140 are spaced apart from each other by a first distance D1.

A spatial image 150 is produced as light corresponding to an image displayed on the display unit 130 is reflected by the projection unit 140 to be projected to the space around the display unit 130. Here, a pixel P1 of the image displayed on the display unit 130 can be projected to a position corresponding to a pixel P11 of the spatial image 150. Accordingly, the pixel P1 of the image displayed on the display unit 130 and the pixel P11 of the spatial image 150 can be symmetrical to each other about the vertical axis that penetrates the center of the projection unit 140.

In one example, as shown in FIGS. 3 and 5, the spatial image 150 is produced when light, emitted from the pixel P1 of the image displayed on the display unit 130, reaches the projection unit 140 along a first optical path and is then reflected by the projection unit 140 to be projected, along a second optical path, to the space around the display unit 130. The first optical path and the second optical path may have the same length.

In this way, as shown in FIG. 4(a), the spatial image 150 is projected to the space around the display unit 130. That is, the spatial image 150 is produced around the display unit 130 at a position symmetrical to the display unit 130 based on the position of the display unit 130. In addition, the first distance D1 between the display unit 130 and the projection unit 140 can be the same as a second distance D2 between the spatial image 150 and the projection unit 140.

Further, the display unit 130 may be a display panel that displays an image, may be a screen that displays an image projected by a display apparatus such as, for example, a projector, or may be a 3D object realized by a stereoscopic display apparatus. In addition, the 3D object may be an image projected to the space in which the display unit 130 is located.

Next, the display unit 130 is spaced apart from the edge region of the projection unit 140 so as to face the projection unit 140 and be parallel to the projection unit 140. The reason for this is that a viewer cannot see the spatial image 150 when the display unit 130 is located to face the central region of the projection unit 140 because the spatial image 150 is again reflected and projected to the region in which the display unit 130 is located.

Therefore, as the display unit 130 is moved to one side from the central region of the projection unit 140, the spatial image 150 can be located around the display unit 130 so as to be symmetrical to the display unit 130. In some instances, the display unit 130 may be spaced apart from the edge region of the projection unit 140 by a given distance, and may be tilted at a prescribed angle relative to a virtual line parallel to the surface of the projection unit 140.

Since the spatial image 150 can be located around the display unit 130 so as to be symmetrical to the display unit 130, the spatial image 150 can also be tilted at the same tilting angle as the display unit 130. Accordingly, as illustrated in FIG. 3, the pixel P1 of the image displayed on the display unit 130 and the pixel P11 of the spatial image 150 are located symmetrical to each other based on the vertical axis that penetrates the center of the projection unit 140.

Further, as illustrated in FIG. 4(b), when the image displayed on the display unit 130 is an object related to a shoe advertisement, the shoe-advertising object can be reflected by the projection unit 140 to thereby be projected to the space around the display unit 130, whereby the spatial image 150 is produced. In addition, the area S2 of the projection unit 140 may be equal to or greater than the area S1 of the display unit 130.

That is, as shown in FIG. 4(a), the area S2 of the projection unit 140 is at least equal to the area S1 of the display unit 130, or is greater than the area S1 of the display unit 130. This is so the projection unit 140 has sufficient area to reflect the entire image displayed on the display unit 130. Since the projection unit 140 directly reflects the entire image displayed on the display unit 130, the size of the spatial image 150 can be the same as the size of the image displayed on the display unit 130.

In one example, when the image displayed on the display unit 130 is an object related to a shoe advertisement, the size of the shoe-advertising object is the same as the size of the spatial image 150 which is projected to a prescribed space as the shoe-advertising object is directly reflected in a full size by the projection unit 140. Meanwhile, the projection unit 140 may include a plate having the first surface facing the display unit 130 and the second surface opposite to the first surface, and the protrusion arranged on either the first surface or the second surface of the plate.

In addition, the protrusion may include first and second slopes, which are tilted at about 45 degrees relative to the surface of the plate, and the angle between the first and second slopes is about 90 degrees. In addition, a plurality of protrusions can be arranged, along the X-axis, on the surface of the plate of the projection unit 140. The length of the protrusions may be the same as the length of the Y-axis of the plate, which is perpendicular to the X-axis.

In one example, as shown in FIG. 3, the protrusions may include first protrusions 141 arranged in odd-numbered rows and second protrusions 142 arranged in even-numbered rows. The second slope of each first protrusion 141 and the first slope of each second protrusion 142 are arranged such that one ends thereof come into contact with each other. As such, the angle between the second slope of the first protrusion 141 and the first slope of the second protrusion 142 is about 90 degrees.

In Further, the first and second protrusions 141 and 142 may have the same height. However, in some instances, the first and second protrusions 141 and 142 may have different heights. In addition, the first and second protrusions 141 and 142 may have the same cross-sectional area. However, in some instances, the first and second protrusions 141 and 142 may have different cross-sectional areas.

In addition, when the protrusions are arranged on the second surface of the plate of the projection unit 140, the inner surfaces of the first and second slopes may be reflective surfaces that reflect light. Accordingly, light corresponding to the image, emitted from the display unit 130, can pass through the plate of the projection unit 140 to be reflected by the first and second slopes of the protrusions, and then pass again through the plate of the projection unit 140, so as to be projected to a prescribed space.

In this instance, the plate and the protrusions of the projection unit 140 may include a transparent material that transmits light. In another instance, when the protrusions are arranged on the first surface of the plate of the projection unit 140, the outer surfaces of the first and second slopes may be reflective surfaces that reflect light.

Accordingly, light corresponding to the image, emitted from the display unit 130, can be reflected by the first slope of the first protrusion and the second slope of the second protrusion, which are adjacent to each other, so as to be projected to a prescribed space. Here, in the protrusions arranged on the first surface of the plate of the projection unit 140, a reflective layer for the total reflection of light can be formed at the outer surfaces of the first and second slopes.

In this instance, the plate and the protrusions of the projection unit 140 may include a transparent material that transmits light, or include an opaque material that does not transmit light. In addition, a protective layer may be formed on the protrusions of the projection unit 140. The thickness of the protective layer may be greater than the height of the protrusions. This serves to prevent the protrusions of the projection unit 140 from being damaged by an external shock.

In another embodiment, the protrusions of the projection unit 140 may include the first protrusions 141 arranged in odd-numbered rows and the second protrusions 142 arranged in even-numbered rows. Further, the second slope of each first protrusion 141 and the first slope of each second protrusion 142 may be spaced apart from each other by a given distance so as to face each other. The angle between the second slope of the first protrusion 141 and the surface of the plate may be about 135 degrees, and the angle between the first slope of the second protrusion 142 and the surface of the plate may be about 135 degrees.

In addition, the first and second protrusions 141 and 142 may be spaced apart from each other by the same distance. However, in some instances, the first and second protrusions 141 and 142 may be spaced apart from each other by different distances. In addition, the thickness of the plate of the projection unit 140 may be smaller than the height of the protrusions of the projection unit 140. This is because an excessively great thickness of the plate of the projection unit 140 may cause the loss of light, thus deteriorating the definition of the spatial image 150, and increase the weight and thickness of the entire projection unit 140.

In this way, through the use of the projection unit 140 having the protrusions, the spatial image projection apparatus of the present embodiment having the above-described configuration achieves a reduction in the thickness of the entire apparatus and ensures that the size of the spatial image is maintained. In addition, the spatial image projection apparatus of the present embodiment achieves a minimum depth thereof, which enables a reduction in the size of a mechanism capable of forming a spatial image.

Figure 6:
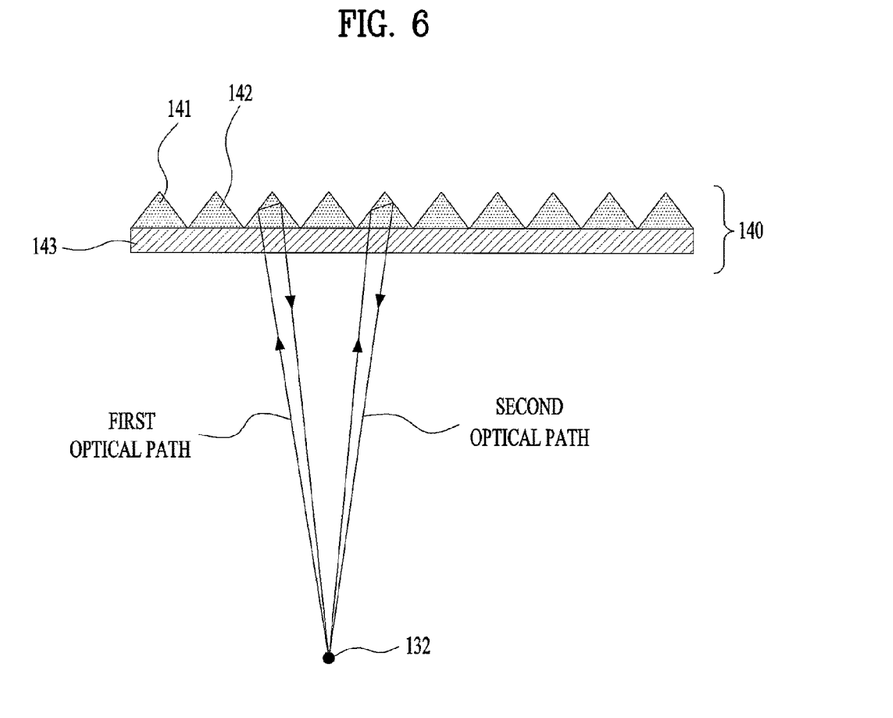
FIG. 6 is a view illustrating the path of light reflected by the projection unit.

Next, FIG. 6 is a view illustrating the path of light reflected by the projection unit 140. In addition, the display unit 130 and the projection unit 140 are spaced apart from each other by a given distance. Further, the display unit 130 displays an image, and the projection unit 140 reflects all light corresponding to the image of the display unit 130.

Also, in the image displayed on the display unit 130, light corresponding to any one point 132 of the image is emitted in several directions. Some of the emitted light beams are directed to the protrusions of the projection unit 140 along a first optical path and are then totally reflected by the protrusions of the projection unit 140 so as to return to the position of the original point 132 along a second optical path. Accordingly, the light corresponding to the entire image displayed on the display unit 130 is totally reflected by the projection unit 140, whereby a spatial image is projected to the original position.

Based on the principle described above, the projection unit 140 includes the first and second protrusions 141 and 142 arranged in plural numbers along the X-axis on the surface of the plate 143 of the projection unit 140. The length of the first and second protrusions 141 and 142 may be the same as the length of the Y-axis of the plate 143, which is perpendicular to the X-axis.

In one example, the projection unit 140 includes a plurality of triangular prism arrays. As such, the projection unit 140 serves as a general mirror, thus causing the light corresponding to the image to be diffused in the Y-axis which is the longitudinal direction of the first and second protrusions 141 and 142. Accordingly, a viewer can see a spatial image projected to a prescribed space with respect to the Y-axis, which is the longitudinal direction of the first and second protrusions 141 and 142, without positional limits.

However, in order to prevent the spatial image from being hidden by the display unit 130, the spatial image can be projected to a position above or below the display unit 130, or to allow the viewer to look up or look down from the upper side or the lower side of the display unit 130. Accordingly, in order to ensure that the spatial image is projected to the space around the display unit, the display unit 130 can be spaced apart from the edge region of the projection unit 140 by a given distance so as to face the projection unit 140 and be parallel to the projection unit 140.

In addition, the distance between the display unit 130 and the projection unit 140 can be the same as the distance between the spatial image and the projection unit 140. In some instances, the display unit 130 can be spaced apart from the edge region of the projection unit 140 by a given distance, and be tilted at a prescribed angle relative to a virtual line parallel to the surface of the projection unit 140.

Figure 7:
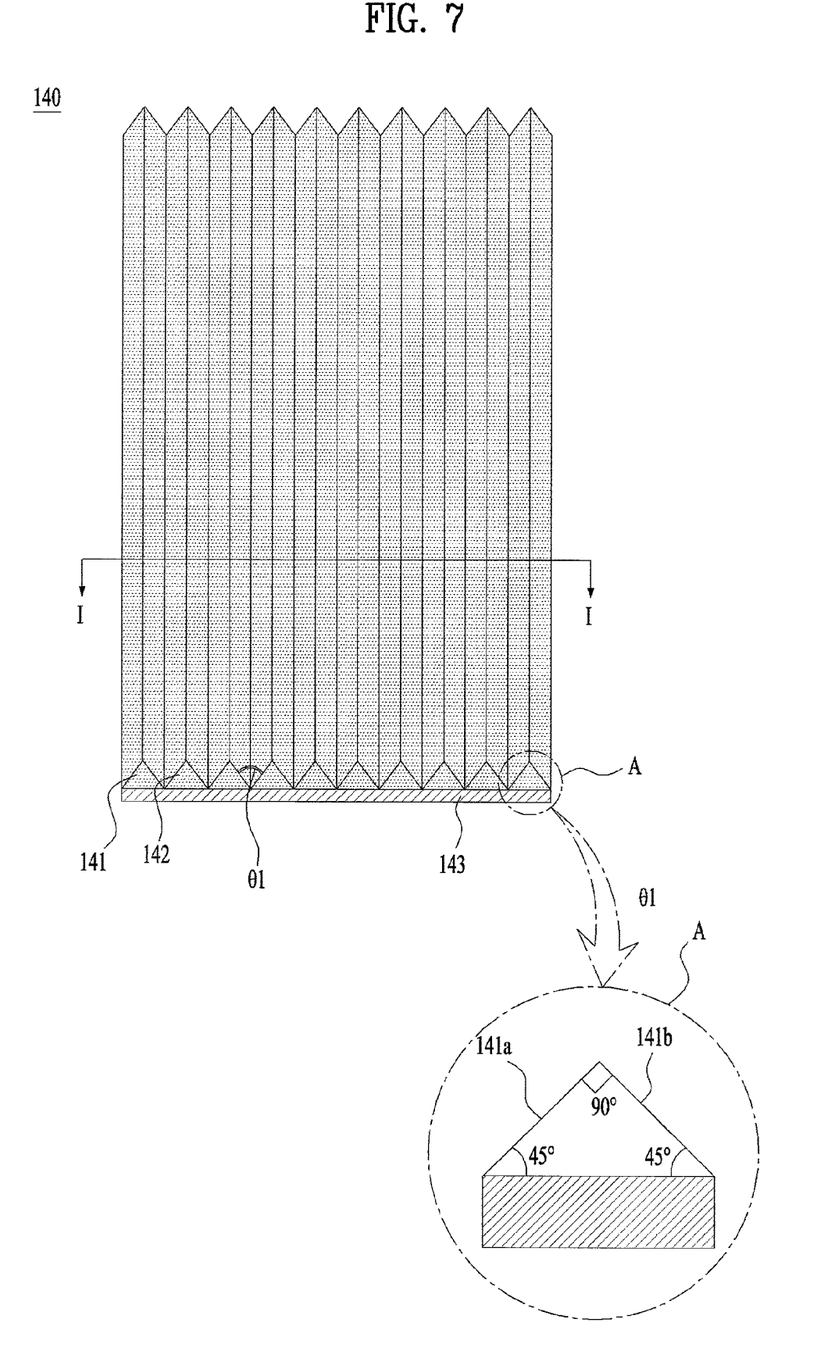
FIG. 7 is a detailed view illustrating the projection unit illustrated in FIG. 3.

Next, FIG. 7 is a detailed view illustrating the projection unit 140 illustrated in FIG. 3. As shown in FIG. 7, the projection unit 140 projects a spatial image to a prescribed space by reflecting light corresponding to an image displayed on the display unit. The projection unit 140 includes the plate 143 and the first and second protrusions 141 and 142 arranged on the plate 143.

In one example, the first protrusions 141 can be arranged in odd-numbered rows and the second protrusions 142 can be arranged in even-numbered rows. In addition, each first protrusion 141 may include first and second slopes 141a and 141b, which are tilted at about 45 degrees relative to the surface of the plate 143, and the angle between the first and second slopes 141a and 141b may be about 90 degrees.

In addition, each second protrusion 142 may have the same slopes as those of the first slope 141. Accordingly, the protrusions can be a triangular prism array. These triangular prism-shaped protrusions may be arranged along the X-axis on the surface of the plate 143. That is, the first protrusions 141 and the second protrusions 142 can be alternately and repeatedly arranged. In one example, the first protrusions 141 can be arranged in odd-numbered rows, and the second protrusions 142 can be arranged in even-numbered rows.

In addition, the protrusions can have the same length as the length of the Y-axis of the plate 143, which is perpendicular to the X-axis. That is, the triangular prism-shaped protrusions can have the same length as the length of the Y-axis of the plate 143. The first and second protrusions 141 and 142 can also have the same length. However, in some instances, the first and second protrusions 141 and 142 may have different lengths.

In addition, the plate 143 of the projection unit 140 includes a lower surface facing the display unit and an upper surface opposite to the lower surface, and the protrusions arranged on the lower surface or the upper surface of the plate 143. Accordingly, the protrusions can be arranged on the lower surface of the plate so as to face the display unit, or be arranged on the upper surface of the plate so as not to face the display unit.

In addition, the second slope 141b of the first protrusion 141 and the first slope 142a of the second protrusion 142 can be arranged such that one ends thereof come into contact with each other. The angle between the second slope 141b of the first protrusion 141 and the first slope 142a of the second protrusion 142 is about 90 degrees.

In another embodiment, the second slope 141b of the first protrusion 141 and the first slope 142a of the second protrusion 142 may be spaced apart from each other by a given distance so as to face each other. The angle between the second slope 141b of the first protrusion 141 and the surface of the plate 143 may be about 135 degrees, and the angle between the first slope 142a of the second protrusion 142 and the surface of the plate 143 may be about 135 degrees.

In addition, the thickness of the plate 143 of the projection unit 140 can be smaller than the height of the protrusions of the projection unit 140. This is because an excessively great thickness of the plate 143 of the projection unit 140 may cause the loss of light, thus deteriorating the definition of the spatial image, and may increase the weight and thickness of the entire projection unit 140.

Figure 8:
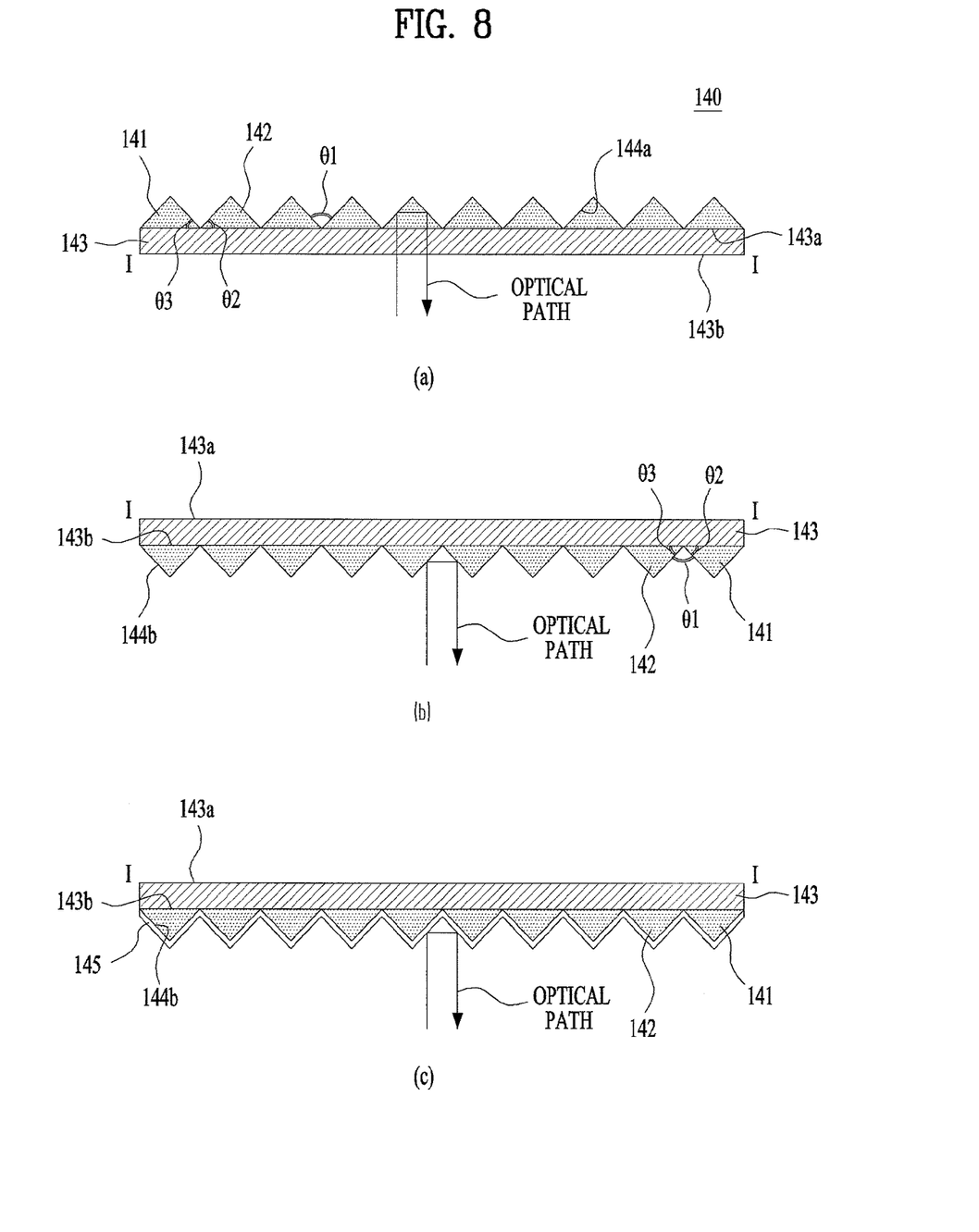
FIG. 8 is a sectional view taken along line I-I of FIG. 7, illustrating the projection unit according to a first embodiment.

Next, FIG. 8 is a sectional view taken along line I-I of FIG. 7, illustrating the projection unit according to a first embodiment. As illustrated in FIG. 8, the projection unit includes the plate 143 and the first and second protrusions 141 and 142 arranged on the plate 143. The first protrusions 141 are arranged in odd-numbered rows and the second protrusions 142 are arranged in even-numbered rows. In addition, the plate 143 includes a lower surface 143b facing the display unit and an upper surface 143a opposite to the lower surface 143b. The first protrusions 141 and the second protrusions 142 are arranged on the upper surface 143a of the plate 143 as illustrated in FIG. 8(a), or are arranged on the lower surface 143b of the plate 143 as illustrated in FIGS. 8(b) and 8(c).

Accordingly, the first protrusions 141 and the second protrusions 142 can be arranged on the upper surface 143a of the plate 143 so as not to face the display unit as illustrated in FIG. 8(a), or can be arranged on the lower surface 143b of the plate 143 so as to face the display unit as illustrated in FIGS. 8(b) and 8(c). In addition, the second slope 141b of the first protrusion 141 and the first slope 142a of the second protrusion 142 are arranged such that one ends thereof come into contact with each other.

Further, the angle θ1 between the second slope 141b of the first protrusion 141 and the first slope 142a of the second protrusion 142 is about 90 degrees. In addition, the angle θ3 between the slope of the first protrusion 141 and the surface of the plate 143 and the angle θ2 between the slope of the second protrusion 142 and the surface of the plate 143 is about 45 degrees.

In addition, the first and second protrusions 141 and 142 may have the same height. However, in some instances, the first and second protrusions 141 and 142 may have different heights. In addition, the first and second protrusions 141 and 142 may have the same cross-sectional area. However, in some instances, the first and second protrusions 141 and 142 may have different cross-sectional areas.

In addition, as illustrated in FIG. 8(a), when the first and second protrusions 141 and 142 are arranged on the upper surface 143a of the plate 143 of the projection unit 140, inner surfaces 144a of the slopes can be reflective surfaces that reflect light. Accordingly, light corresponding to the image, emitted from the display unit 130, passes through the plate 143 of the projection unit 140 to be reflected by the slopes of the first and second protrusions 141 and 142, and then again pass through the plate 143 of the projection unit 140, so as to be projected to a prescribed space.

In this instance, the plate 143 and the first and second protrusions 141 and 142 of the projection unit 140 can include a transparent material that transmits light. In another instance, as illustrated in FIG. 8(b), when the first and second protrusions 141 and 142 are arranged on the lower surface 143b of the plate 143 of the projection unit 140, outer surfaces 144b of the slopes may be reflective surfaces that reflect light. Accordingly, light corresponding to the image, emitted from the display unit 130, is reflected by the first slope of the first protrusion 141 and the second slope of the second protrusion 142, so as to be projected to a prescribed space.

Here, as illustrated in FIG. 8(c), when the first and second protrusions 14 and 142 are arranged on the lower surface 143b of the plate 143 of the projection unit 140, a reflective layer 145 for the total reflection of light is formed at the outer surfaces 144b of the slopes. In this instance, the plate 143 and the first and second protrusions 141 and 142 of the projection unit 140 may include a transparent material that transmits light, or may be formed of an opaque material that does not transmit light.

Figure 9:
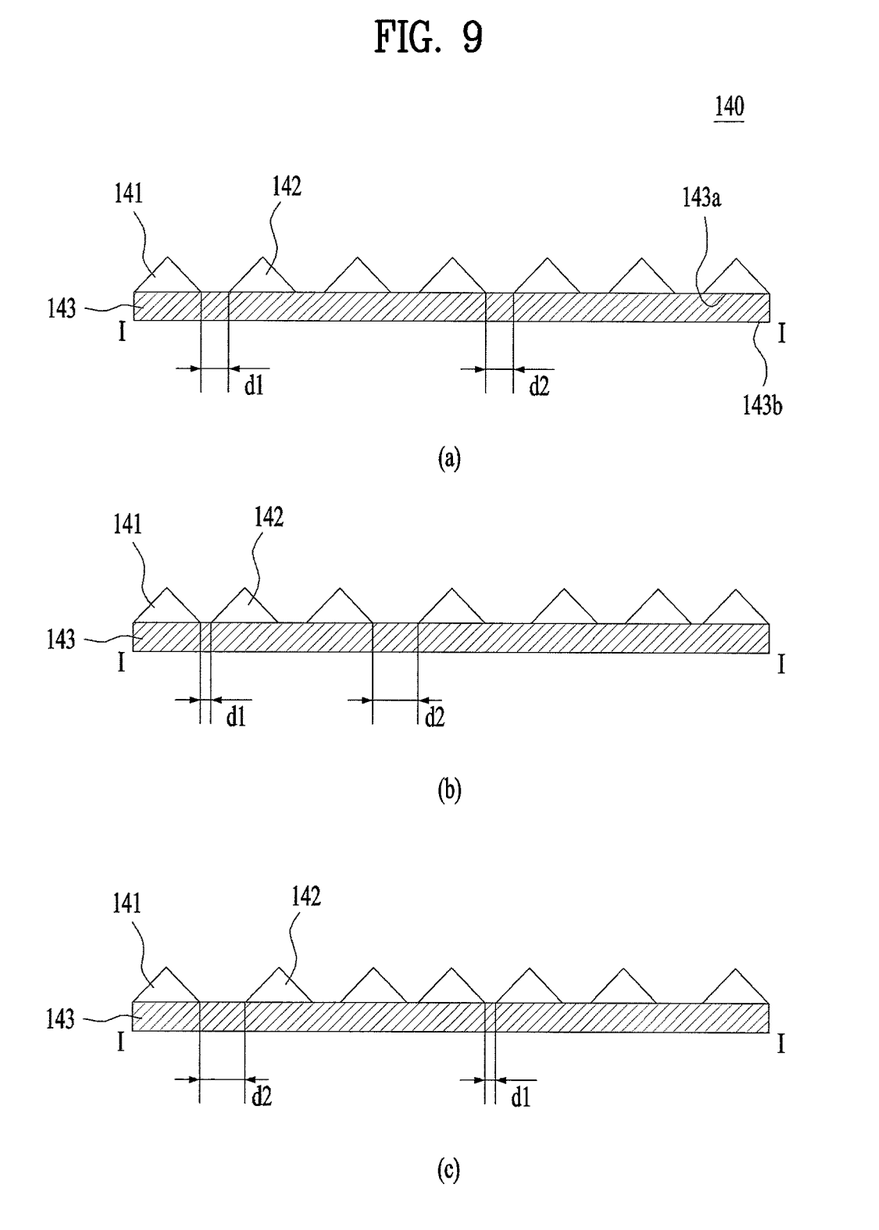
FIG. 9 is a sectional view taken along line I-I of FIG. 7, illustrating the projection unit according to a second embodiment.

Next, FIG. 9 is a sectional view taken along line I-I of FIG. 7 illustrating the projection unit according to a second embodiment. As illustrated in FIG. 9, the projection unit 140 includes the plate 143 and the first and second protrusions 141 and 142 arranged on the plate 143. The first protrusions 141 are arranged in odd-numbered rows and the second protrusions 142 are arranged in even-numbered rows.

In addition, the second slope of each first protrusion 141 and the first slope of each second protrusion 142 are spaced apart from each other by a given distance so as to face each other. Further, the angle between the second slope of the first protrusion 141 and the surface of the plate 143 is about 135 degrees, and the angle between the first slope of the second protrusion 142 and the surface of the plate 143 is about 135 degrees.

In addition, as illustrated in FIG. 9(a), the first and second protrusions 141 and 142 are spaced apart from each other by the same distance. In one example, the distance d1 between the first and second protrusions 141 and 142, located at the edge region of the plate 143, and the distance d2 between the first and second protrusions 141 and 142 located at the central region of the plate 143 are the same.

However, in some instances, as illustrated in FIGS. 9(b) and 9(c), the first and second protrusions 141 and 142 are spaced apart from each other by different distances. In one example, the distance d1 between the first and second protrusions 141 and 142 located at the edge region of the plate 143 and the distance d2 between the first and second protrusions 141 and 142 located at the central region of the plate 143 are different. That is, as illustrated in FIG. 9(b), the distance between the first and second protrusions 141 and 142 gradually increases with an increasing distance from the edge region with a decreasing distance to the central region of the plate 143.

In some instances, as illustrated in FIG. 9(c), the distance between the first and second protrusions 141 and 142 gradually decreases with an increasing distance from the edge region or with a decreasing distance to the central region of the plate 143. The reason for adjusting the distance between the first and second protrusions 141 and 142 is because various shapes of spatial images are produced by adjusting the brightness and definition of the projected spatial image, which provides variety that stimulates the interest of the viewer in stereoscopic images.

Figure 10:
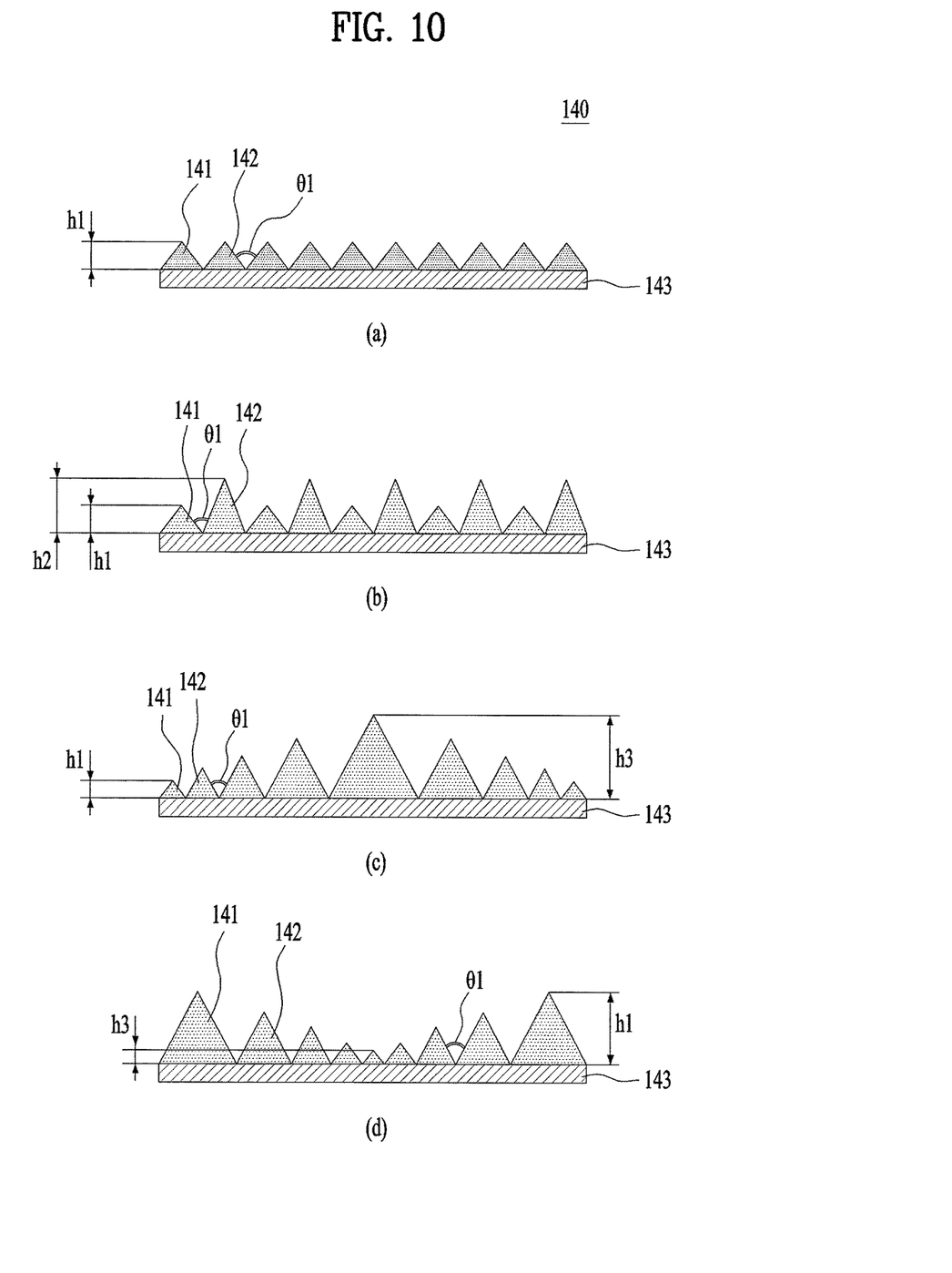
FIG. 10 is a sectional view illustrating the height of protrusions of the projection unit.

Next, FIG. 10 is a sectional view illustrating the height of the protrusions of the projection unit. As illustrated in FIG. 10, the projection unit 140 includes the plate 143 and the first and second protrusions 141 and 142 arranged on the plate 143. The first protrusions 141 are arranged in odd-numbered rows and the second protrusions 142 are arranged in even-numbered rows.

In addition, the plate 143 includes a lower surface facing the display unit and an upper surface opposite to the lower surface. The first protrusions 141 and the second protrusions 142 are arranged on the upper surface of the plate, but can be arranged on the lower surface of the plate 143. In addition, the second slope 141b of the first protrusion 141 and the first slope 142a of the second protrusion 142 are arranged such that one ends thereof come into contact with each other. Further, the angle θ1 between the second slope 141b of the first protrusion 141 and the first slope 142a of the second protrusion 142 are about 90 degrees.

In addition, the angle θ3 between the slope of the first protrusion 141 and the surface of the plate 143 and the angle θ2 between the slope of the second protrusion 142 and the surface of the plate 143 are about 45 degrees. In addition, the first and second protrusions 141 and 142 have the same height h1 as illustrated in FIG. 10(a). The first and second protrusions 141 and 142 may have the same cross-sectional area. However, in some instances, the first and second protrusions 141 and 142 may have different heights as illustrated in FIGS. 10(b), 10(c) and 10(d). In addition, the first and second protrusions 141 and 142 may have different cross-sectional areas.

In one example, the height h1 of the first protrusion 141 and the height h2 of the second protrusion 142 are different. As illustrated in FIG. 10(b), the height h1 of the first protrusion 141 is smaller than the height h2 of the second protrusion 142. However, in some instances, the height h1 of the first protrusion 141 can be greater than the height h2 of the second protrusion 142.

In addition, the height h1 of the first and second protrusions 141 and 142, located at the edge region of the plate 143, is different from the height h3 of the first and second protrusions 141 and 142 located at the central region of the plate 143. That is, as illustrated in FIG. 10(c), the height of the first and second protrusions 141 and 142 gradually increases with an increasing distance from the edge region or with a decreasing distance to the central region of the plate 143.

In some instances, as illustrated in FIG. 10(d), the height of the first and second protrusions 141 and 142 gradually decreases with an increasing distance from the edge region or with a decreasing distance to the central region of the plate 143. The reason for adjusting the distance between the first and second protrusions 141 and 142 is because various shapes of spatial images are produced by adjusting the brightness and definition of the projected spatial image, which provides variety that stimulates the interest of the viewer in stereoscopic images.

Figure 11:
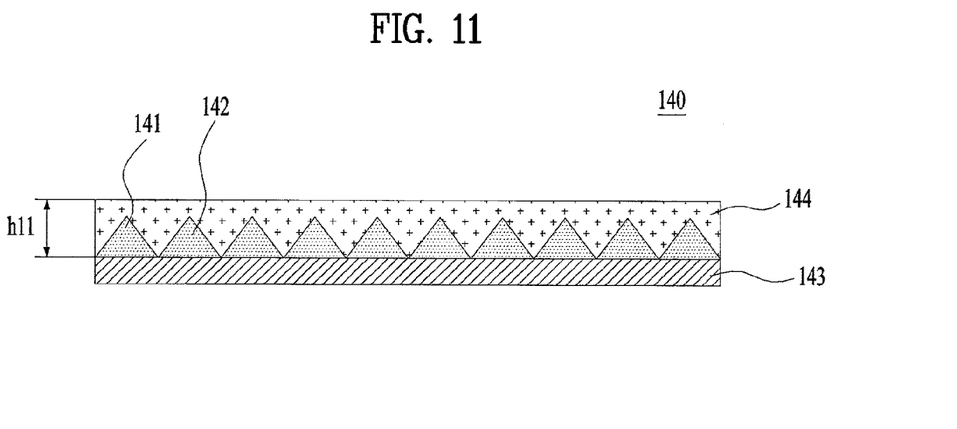
FIG. 11 is a sectional view illustrating the projection unit having a protective layer.

Next, FIG. 11 is a sectional view illustrating the projection unit having a protective layer. As illustrated in FIG. 11, the projection unit 140 includes the plate 143 and the first and second protrusions 141 and 142. The first protrusions 141 are arranged in odd-numbered rows and the second protrusions 142 are arranged in even-numbered rows.

In addition, a protective layer 144 is formed on the first and second protrusions 141 and 142 of the projection unit 140. The thickness h11 of the protective layer 144 is greater than the height of the first and second protrusions 141 and 142. This serves to prevent the protrusions of the projection unit 140 from being damaged by an external shock.

In one example, the protective layer 144 includes a transparent material that transmits light, or may be formed of an opaque material that shields light. In addition, the plate 143 includes the lower surface facing the display unit and the upper surface opposite to the lower surface. The first protrusions 141 and the second protrusions 142 may be arranged on the upper surface of the plate 143, or may be arranged on the lower surface of the plate 143.

Here, when the first protrusions 141 and the second protrusions 142 are arranged on the upper surface of the plate 143 opposite to the light introduction surface, the protective layer 144 may include an opaque material that shields light, or may include a transparent material that transmits light. In some instances, when the first protrusions 141 and the second protrusions 142 are arranged on the lower surface of the plate 143 which is the light introduction surface, the protective layer 144 may include a transparent material that transmits light.

As described above, the projection unit 140 of the present embodiment reduces damage to the protrusions by an external shock by providing the protective layer 144 for the projection of the protrusions, and therefore the spatial image projection apparatus can be installed in various spaces regardless of installation environments.

Figure 12:
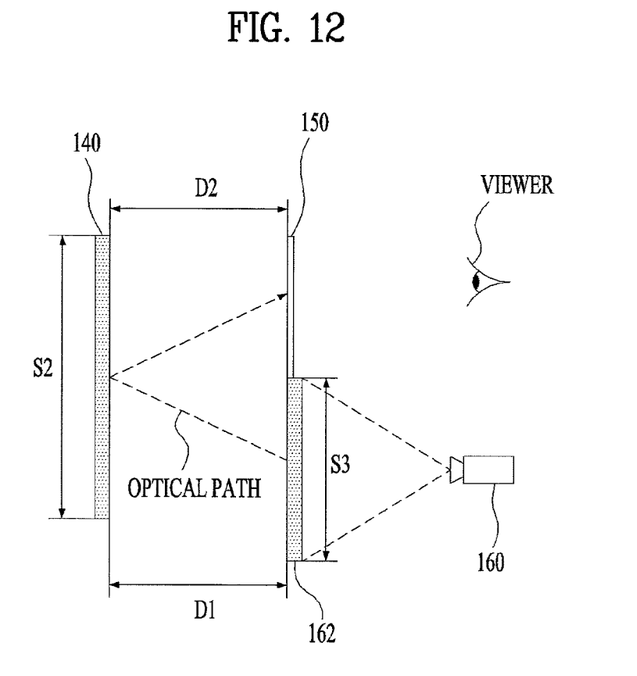
FIG. 12 is a view illustrating a spatial image projection apparatus using a projector.

Next, FIG. 12 is a view illustrating a spatial image projection apparatus using a projector. As illustrated in FIG. 12, the spatial image projection apparatus includes a projector 160, a screen 162 which displays an image projected by the projector 160, and the projection unit 140. The screen 162 and the projection unit 140 are spaced apart from each other by a first distance D1. In addition, light corresponding to the image displayed on the screen 162 is reflected by the projection unit 140 so as to be projected to the space around the screen 162, whereby the spatial image 150 is produced.

The first distance D1 between the screen 162 and the projection unit 140 is the same as the second distance D2 between the spatial image 150 and the projection unit 140. In some instances, the screen 162, on which the image projected by the projector 160 is displayed, may be a 3D object realized by a stereoscopic display apparatus. In addition, the 3D object may be an image projected to the space in which the screen 162 is located.

Next, the screen 162 is spaced apart from the edge region of the projection unit 140 so as to face the projection unit 140 and is parallel to the projection unit 140. The reason for this is that a viewer cannot see the spatial image 150 when the screen 162 is located to face the central region of the projection unit 140 because the spatial image 150 is again reflected and projected to the region in which the screen 162 is located.

Therefore, as the screen 162 is moved to one side from the central region of the projection unit 140, the spatial image 150 can be located around the screen 162 so as to be symmetrical to the screen 162. In addition, the area S2 of the projection unit 140 is equal to or greater than the area S3 of the screen 162. That is, the area S2 of the projection unit 140 is at least equal to the area S3 of the screen 162, or is greater than the area S3 of the screen 162. This is so the projection unit 140 has sufficient area to reflect the entire image displayed on the screen 162.

Since the projection unit 140 directly reflects the entire image displayed on the screen 162, the size of the spatial image 150 can be the same as the size of the image displayed on the screen 162. In some instances, the screen 162 can be spaced apart from the edge region of the projection unit 140 by a given distance, and be tilted, at a prescribed angle, relative to a virtual line parallel to the surface of the projection unit 140. Since the spatial image 150 can be located around the screen 162 so as to be symmetrical to the screen 162, the spatial image 150 can be tilted at the same angle as the screen 162.

Figure 13:
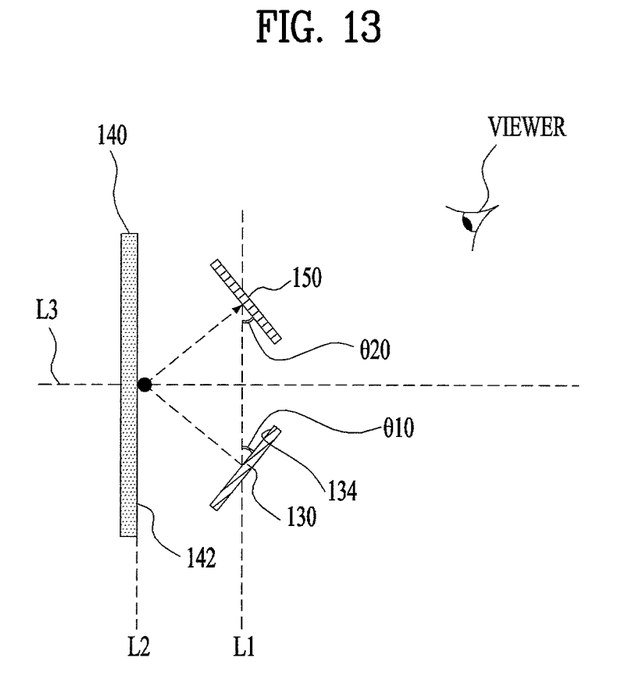
FIG. 13 is a view illustrating a spatial image projection apparatus using a tilted display unit.

Next, FIG. 13 is a view illustrating a spatial image projection apparatus using a tilted display unit. As illustrated in FIG. 13, in the spatial image projection apparatus of the present embodiment, the display unit 130 and the projection unit 140 are spaced apart from each other by a given distance. The display unit 130 is also tilted at a prescribed angle θ1 relative to the line L1 parallel to the line L2 which extends along the surface of the projection unit 140.

In this instance, the spatial image 150 is located around the display unit 130 so as to be symmetrical to the display unit 130. Thus, the spatial image 150 is tilted at the same angle θ1 as the display unit 130. That is, the spatial image 150 is tilted at a prescribed angle θ2 relative to the line L1 parallel to the line L2 which extends along the surface of the projection unit 140.

Accordingly, the tilting angle θ1 of the display unit 130 and the tilting angle θ2 of the spatial image 150 are the same. Hence, pixels of the image displayed on the display unit 130 and pixels of the spatial image 150 may be located symmetrical to each other based on the vertical line L3 that penetrates the center of the projection unit 140. In one example, when the image displayed on the display unit 130 is an object related to a shoe advertisement, the size of the shoe-advertising object can be the same as the size of the shoe-advertising spatial image 150 which is directly reflected by the projection unit 140 to thereby be projected to the prescribed space.

Further, the display unit 130 may be a display that displays a prescribed image. In one example, the display unit 130 includes at least one of a liquid crystal display (LCD), a thin film transistor liquid crystal display (TFT LCD), an organic light-emitting diode (OLED) display, a flexible display, and a 3D display, and some of these displays may be a transparent type or light transmissive type display to allow the viewer to view the outside through the display.

As is apparent from the above description, according to one embodiment of the present invention, as a result of providing a projection unit having a plurality of protrusions, the thickness of a spatial image projection apparatus is reduced and a spatial image that has the same size as an image displayed on the display unit is provided. In addition, by minimizing the depth of the spatial image projection apparatus, the size of a mechanism capable of forming a spatial image is reduced.

Although the exemplary embodiments have been illustrated and described as above, of course, it will be apparent to those skilled in the art that the embodiments are provided to assist understanding of the present invention and the present invention is not limited to the above described particular embodiments, and various modifications and variations can be made in the present invention without departing from the spirit or scope of the present invention, and the modifications and variations should not be understood individually from the viewpoint or scope of the present invention.

What is claimed is:

1. A spatial image projection apparatus, comprising:
   a receiver configured to receive an image signal;
   a display unit configured to display an image acquired by processing the image signal; and
   a projection unit configured to project a spatial image to a prescribed space by reflecting light corresponding to the image displayed on the display unit,
   wherein the projection unit includes:
   a plate having a first surface facing the display unit and a second surface opposite to the first surface; and
   a protrusion including a first protrusion and a second protrusion arranged on the first surface or the second surface of the plate, and
   wherein each of the first protrusion and the second protrusion includes first and second slopes tilted at about 45 degrees relative to the surface of the plate, and an angle between the first and second slopes is about 90 degrees, and
   wherein the first protrusion and the second protrusion are spaced apart from each other.

2. The apparatus according to claim 1, wherein the first and second protrusions have the different heights.

3. The apparatus according to claim 1, wherein the first and second protrusions have the different cross-sectional areas.

4. The apparatus according to claim 1, wherein the first and second protrusions arranged on the second surface of the plate include a reflective surface forming inner surfaces of the first and second slopes so as to reflect light.

5. The apparatus according to claim 4, wherein the light passes through the plate to be reflected by the first and second slopes of the first and second protrusions, and then again passes through the plate so as to be projected to the prescribed space.

6. The apparatus according to claim 1, wherein the first and second protrusions arranged on the first surface of the plate include a reflective surface forming outer surfaces of the first and second slopes so as to reflect the light.

7. The apparatus according to claim 6, wherein the light is reflected by the first slope of the first protrusion and the second slope of the second protrusion so as to be projected to the prescribed space, the first protrusion and the second protrusion being adjacent to each other.

8. The apparatus according to claim 6, wherein the first and second protrusions arranged on the first surface of the plate include reflective layers forming outer surfaces of the first and second slopes for total reflection of the light.

9. The apparatus according to claim 1, wherein the first and second protrusions are provided thereon with a protective layer.

10. The apparatus according to claim 9, wherein the protective layer has a greater thickness than a height of the protrusions.

11. The apparatus according to claim 1, wherein the spatial image is projected to a space around the display unit.

12. The apparatus according to claim 1, wherein a distance between the display unit and the projection unit is the same as a distance between the spatial image and the projection unit.

13. The apparatus according to claim 1, wherein the display unit includes at least one of a display panel, a screen, and a 3D object for display of the image.

14. The apparatus according to claim 1, wherein the display unit is spaced apart from an edge region of the projection unit by a given distance so as to face the projection unit and be parallel to the projection unit.

15. The apparatus according to claim 1, wherein the display unit is spaced apart from an edge region of the projection unit by a given distance, and is tilted at a prescribed angle relative to a line parallel to the surface of the projection unit.

16. The apparatus according to claim 1, wherein a pixel of the image displayed on the display unit and a pixel of the spatial image are located symmetrical to each other based on a vertical axis penetrating the center of the projection unit.

17. The apparatus according to claim 1, wherein the projection unit has an area equal to or greater than an area of the display unit.

18. The apparatus according to claim 1, wherein the first and second protrusions are spaced apart from each other by different distances.

19. The apparatus according to claim 18, wherein the distance between the first and second protrusions gradually increases with an increasing distance from an edge region of the plate with a decreasing distance to a central region of the plate.

20. The apparatus according to claim 18, wherein the distance between the first and second protrusions gradually decreases with an increasing distance from an edge region of the plate with a decreasing distance to a central region of the plate.

* * * * *